(12) United States Patent
Wang et al.

(10) Patent No.: US 8,917,439 B2
(45) Date of Patent: Dec. 23, 2014

(54) SHUTTER MODE FOR COLOR DISPLAY DEVICES

(75) Inventors: Ming Wang, Union City, CA (US); Craig Lin, San Jose, CA (US); Roman Ivanov, Milpitas, CA (US); Xiaojia Zhang, Fremont, CA (US); Robert A. Sprague, Saratoga, CA (US)

(73) Assignee: E Ink California, LLC, Fremont, CA (US)

( * ) Notice: Subject to any disclaimer, the term of this patent is extended or adjusted under 35 U.S.C. 154(b) by 0 days.

(21) Appl. No.: 13/370,186

(22) Filed: Feb. 9, 2012

(65) Prior Publication Data

US 2013/0208338 A1    Aug. 15, 2013

(51) Int. Cl.
*G02B 26/00*  (2006.01)

(52) U.S. Cl.
USPC ........... 359/296; 359/292; 359/293; 359/294; 359/295

(58) Field of Classification Search
USPC .................................................. 359/292–297
See application file for complete search history.

(56) References Cited

U.S. PATENT DOCUMENTS

| | | |
|---|---|---|
| 3,756,693 A | 9/1973 | Ota |
| 3,892,568 A | 7/1975 | Ota |
| 4,298,448 A | 11/1981 | Muller et al. |
| 5,378,574 A | 1/1995 | Winnik et al. |
| 5,980,719 A | 11/1999 | Cherukuri et al. |
| 6,198,809 B1 | 3/2001 | Disanto et al. |
| 6,337,761 B1 | 1/2002 | Rogers et al. |
| 6,373,461 B1 | 4/2002 | Hasegawa et al. |
| 6,486,866 B1 | 11/2002 | Kuwahara et al. |
| 6,525,866 B1 | 2/2003 | Lin et al. |
| 6,538,801 B2 | 3/2003 | Jacobson et al. |
| 6,600,534 B1 | 7/2003 | Tanaka et al. |
| 6,650,462 B2 | 11/2003 | Katase |
| 6,693,620 B1 | 2/2004 | Herb et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,751,007 B2 | 6/2004 | Liang et al. |
| 6,829,078 B2 | 12/2004 | Liang et al. |
| 6,864,875 B2 | 3/2005 | Drzaic et al. |
| 6,947,203 B2 | 9/2005 | Kanbe |
| 6,967,762 B2 | 11/2005 | Machida et al. |

(Continued)

FOREIGN PATENT DOCUMENTS

| | | |
|---|---|---|
| EP | 1 089 118 | 4/2001 |
| JP | 2007033710 A | 2/2007 |

(Continued)

OTHER PUBLICATIONS

U.S. Appl. No. 13/225,184, filed Sep. 2, 2011, Wang et al.

(Continued)

*Primary Examiner* — Scott J Sugarman
*Assistant Examiner* — Mustak Choudhury
(74) *Attorney, Agent, or Firm* — Perkins Coie LLP

(57) ABSTRACT

The present invention is directed to a color display comprising an electrophoretic fluid which comprises one or two types of pigment particles dispersed in a clear and colorless or clear and colored solvent, wherein said electrophoretic fluid is sandwiched between a common electrode and a plurality of driving electrodes. The driving electrodes are kept at a certain distance in order to expose a background layer.

21 Claims, 15 Drawing Sheets

(56) References Cited

U.S. PATENT DOCUMENTS

| | | |
|---|---|---|
| 7,009,756 B2 | 3/2006 | Kishi et al. |
| 7,034,987 B2 | 4/2006 | Schlangen |
| 7,038,655 B2 | 5/2006 | Herb et al. |
| 7,038,670 B2 | 5/2006 | Liang et al. |
| 7,046,228 B2 | 5/2006 | Liang et al. |
| 7,050,218 B2 | 5/2006 | Kanbe |
| 7,057,798 B2 | 6/2006 | Ukigaya |
| 7,075,502 B1 | 7/2006 | Drzaic et al. |
| 7,116,466 B2 | 10/2006 | Whitesides et al. |
| 7,226,550 B2 | 6/2007 | Hou et al. |
| 7,271,947 B2 | 9/2007 | Liang et al. |
| 7,283,119 B2 | 10/2007 | Kishi |
| 7,283,199 B2 | 10/2007 | Aichi et al. |
| 7,312,916 B2 | 12/2007 | Pullen et al. |
| 7,342,556 B2 | 3/2008 | Oue et al. |
| 7,365,732 B2 | 4/2008 | Matsuda et al. |
| 7,382,351 B2 | 6/2008 | Kishi |
| 7,411,719 B2 | 8/2008 | Paolini et al. |
| 7,417,787 B2 | 8/2008 | Chopra et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,605,972 B2 | 10/2009 | Kawai et al. |
| 7,652,656 B2 | 1/2010 | Chopra et al. |
| 7,679,599 B2 | 3/2010 | Kawai |
| 7,686,463 B2 | 3/2010 | Goto |
| 7,760,419 B2 | 7/2010 | Lee |
| 7,782,292 B2 | 8/2010 | Miyasaka et al. |
| 7,808,696 B2 | 10/2010 | Lee et al. |
| 7,830,592 B1 | 11/2010 | Sprague et al. |
| 7,852,547 B2 | 12/2010 | Kim |
| 7,852,548 B2 | 12/2010 | Roh |
| 7,982,941 B2 | 7/2011 | Lin et al. |
| 8,072,675 B2 | 12/2011 | Lin et al. |
| 8,089,686 B2 | 1/2012 | Addington et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,174,492 B2 | 5/2012 | Kim et al. |
| 8,237,892 B1 | 8/2012 | Sprague et al. |
| 8,355,196 B2 | 1/2013 | Yan et al. |
| 8,395,836 B2 | 3/2013 | Lin et al. |
| 8,477,405 B2 | 7/2013 | Ishii et al. |
| 8,520,296 B2 | 8/2013 | Wang et al. |
| 8,537,104 B2 | 9/2013 | Markvoort et al. |
| 8,570,272 B2 | 10/2013 | Hsieh et al. |
| 8,605,354 B2 | 12/2013 | Zhang et al. |
| 8,649,084 B2 | 2/2014 | Wang et al. |
| 8,717,664 B2 | 5/2014 | Wang et al. |
| 2002/0033792 A1 | 3/2002 | Inoue |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0190115 A1 | 9/2004 | Liang et al. |
| 2004/0263947 A1 | 12/2004 | Drzaic et al. |
| 2005/0151709 A1 | 7/2005 | Jacobson et al. |
| 2005/0190431 A1 | 9/2005 | Matsuda |
| 2006/0023296 A1* | 2/2006 | Whitesides et al. .......... 359/293 |
| 2007/0002008 A1 | 1/2007 | Tam |
| 2007/0080928 A1 | 4/2007 | Ishii et al. |
| 2007/0273637 A1 | 11/2007 | Zhou et al. |
| 2008/0042928 A1 | 2/2008 | Schlangen et al. |
| 2008/0174531 A1 | 7/2008 | Sah |
| 2009/0034054 A1 | 2/2009 | Ikegami et al. |
| 2009/0213452 A1 | 8/2009 | Lin et al. |
| 2009/0251763 A1 | 10/2009 | Sprague et al. |
| 2010/0103502 A1* | 4/2010 | Jacobson et al. .............. 359/296 |
| 2010/0165005 A1 | 7/2010 | Sprague |
| 2010/0165448 A1 | 7/2010 | Sprague |
| 2011/0199671 A1 | 8/2011 | Amundson et al. |
| 2011/0217639 A1 | 9/2011 | Sprague |
| 2011/0234557 A1 | 9/2011 | Yang et al. |
| 2011/0261433 A1 | 10/2011 | Sprague et al. |
| 2011/0286076 A1* | 11/2011 | Lin et al. ....................... 359/296 |
| 2011/0292094 A1 | 12/2011 | Lin |
| 2012/0007897 A1 | 1/2012 | Yang et al. |
| 2012/0307346 A1 | 12/2012 | Sprague |
| 2013/0176612 A1 | 7/2013 | Sprague et al. |
| 2013/0208338 A1 | 8/2013 | Wang et al. |
| 2014/0011913 A1 | 1/2014 | Du et al. |
| 2014/0022624 A1 | 1/2014 | Yang et al. |
| 2014/0055840 A1 | 2/2014 | Zang et al. |
| 2014/0078036 A1 | 3/2014 | Zhang et al. |
| 2014/0078576 A1 | 3/2014 | Sprague |
| 2014/0092466 A1 | 4/2014 | Wang et al. |

FOREIGN PATENT DOCUMENTS

| | | |
|---|---|---|
| JP | 2009116041 | 5/2009 |
| JP | 2009192637 | 8/2009 |
| KR | 10-2007-0082680 | 8/2007 |
| KR | 10-2008-0023913 | 3/2008 |
| WO | WO 99/53373 | 10/1999 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/300,178, filed Nov. 18, 2011, Sprague et al.
U.S. Appl. No. 13/360,378, filed Jan. 27, 2012, Zhang.
U.S. Appl. No. 13/551,541, filed Jul. 17, 2012, Yang et al.
U.S. Appl. No. 13/633,788, filed Oct. 2, 2012, Wang et al.
U.S. Appl. No. 14/242,793, filed Apr. 1, 2014, Wang et al.

* cited by examiner

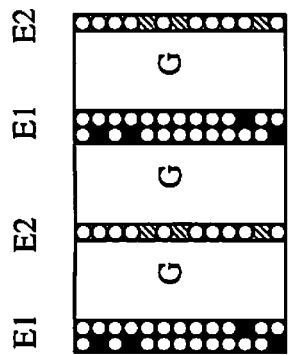 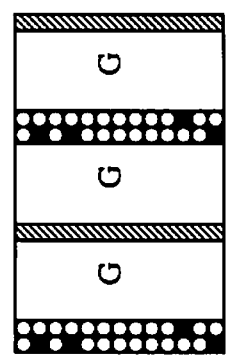 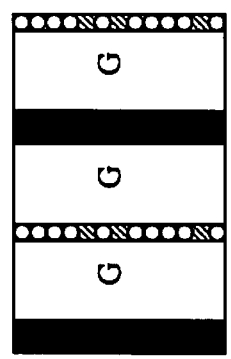
Figure 3a  Figure 3b  Figure 3c
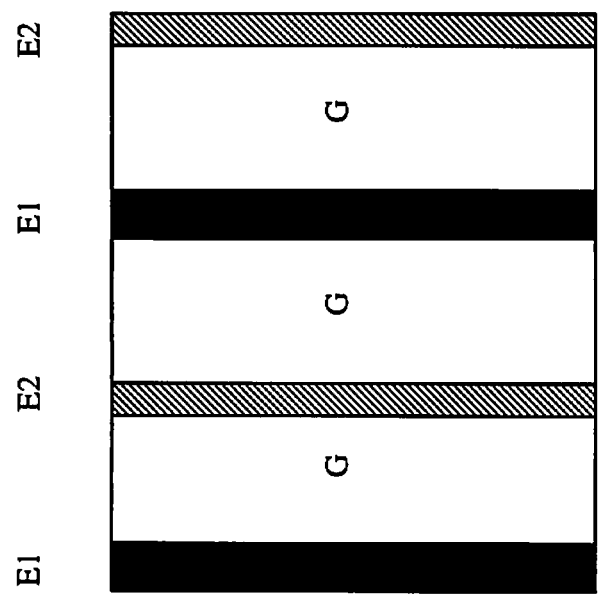
Figure 3

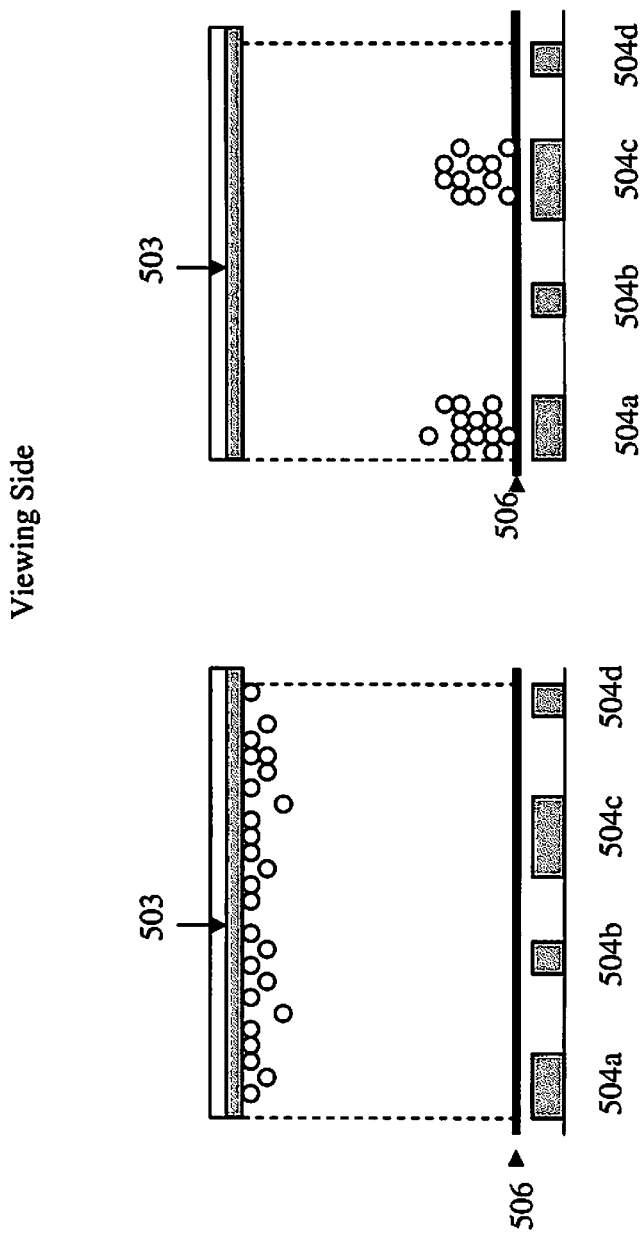

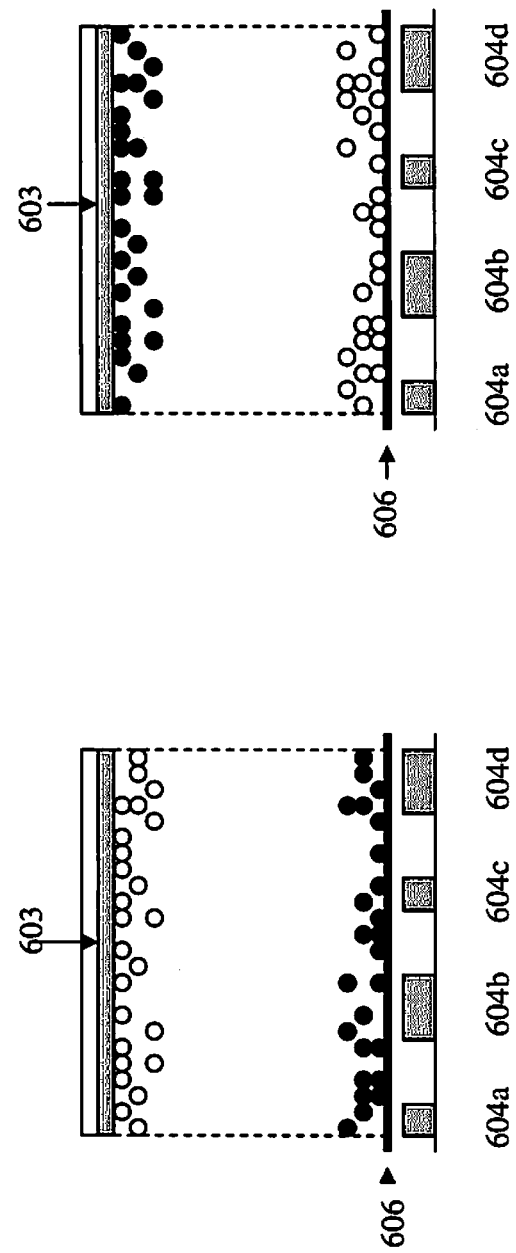

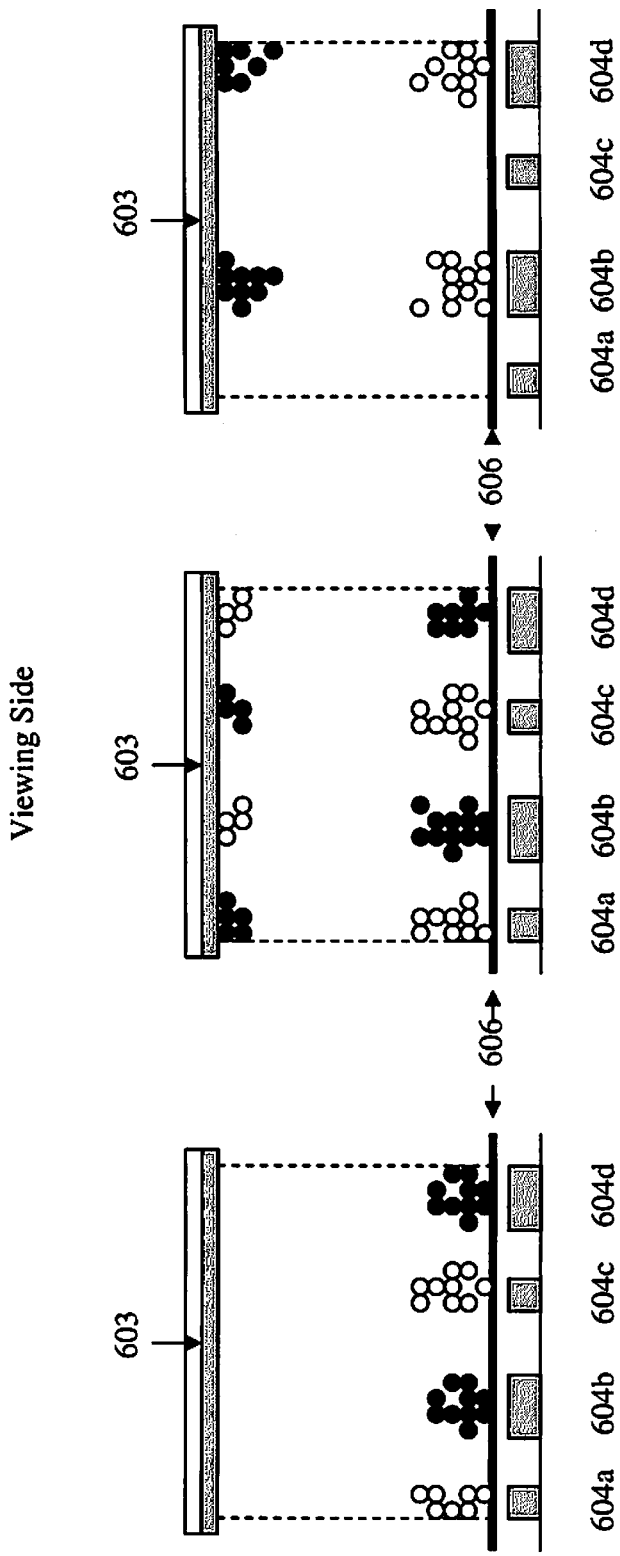

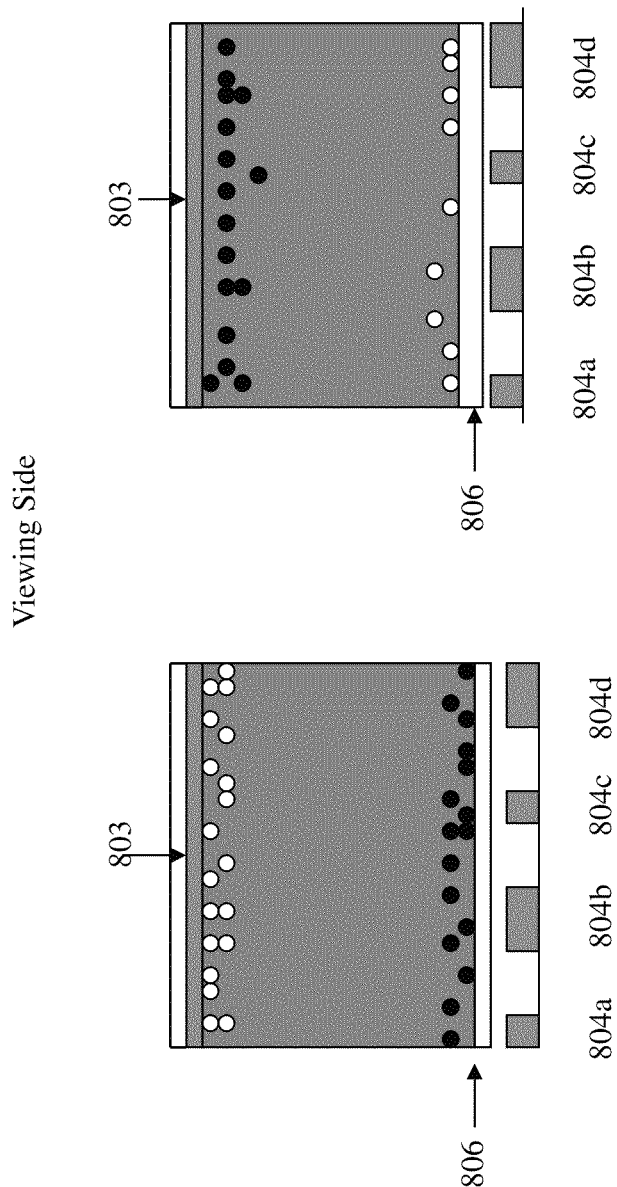

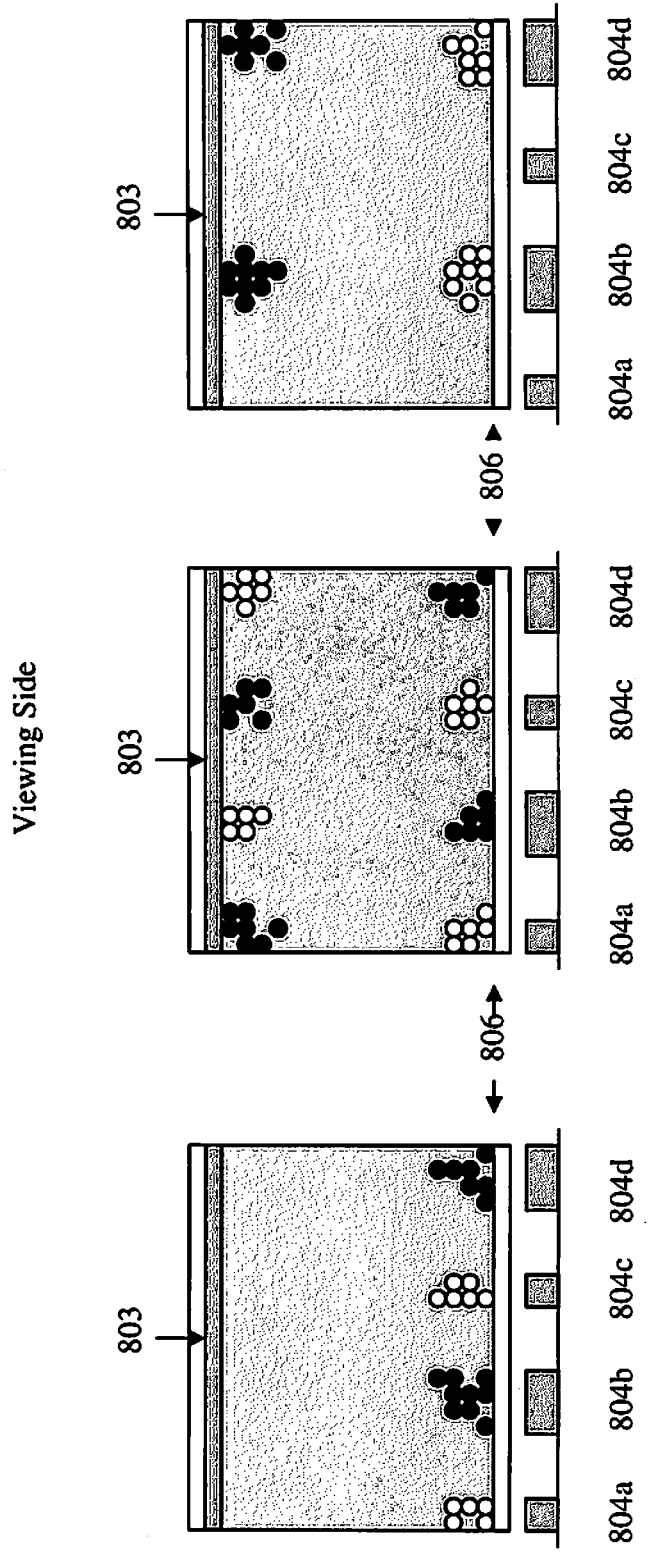

US 8,917,439 B2

SHUTTER MODE FOR COLOR DISPLAY DEVICES

The present invention is directed to display devices which are capable of displaying multiple color states.

BACKGROUND OF THE INVENTION

An electrophoretic display is a device based on the electrophoresis phenomenon of charged pigment particles dispersed in a solvent. The display usually comprises two electrode plates placed opposite of each other and a display fluid comprising charged pigment particles dispersed in a solvent is sandwiched between the two electrode plates. When a voltage difference is imposed between the two electrode plates, the charged pigment particles may migrate to one side or the other, depending on the polarity of the voltage difference, to cause either the color of the pigment particles or the color of the solvent to be seen from the viewing side of the display.

Alternatively, an electrophoretic dispersion may have two types of pigment particles of contrasting colors and carrying opposite charges, and the two types of pigment particles are dispersed in a clear solvent or solvent mixture. In this case, when a voltage difference is imposed between the two electrode plates, the two types of pigment particles would move to the opposite ends (top or bottom) in a display cell. Thus one of the colors of the two types of the pigment particles would be seen at the viewing side of the display cell.

The method employed to drive an electrophoretic display has a significant impact on the performance of the display, especially the quality of the images displayed.

Shutter mode driving involves moving the charged pigment particles laterally to the sides to expose the color of a background layer. However, in practice, it is difficult to clear the particles gathered on a driving electrode. This is because the horizontal electrical field in the center area of the driving electrodes is low. A horizontal electrical field only exists at the edge areas of the neighboring driving electrodes.

SUMMARY OF THE INVENTION

The present inventors now have found that by increasing the space between two neighboring driving electrodes and adjusting the width of the driving electrodes based on particle loading, particles can be driven horizontally in a more efficient manner. The electrode design of the present invention improves the driving efficiency.

More specifically, the present invention is directed to a display device comprising a sub-pixel or pixel, which comprises a) a display fluid sandwiched between a first layer comprising a common electrode and a second layer comprising multiple driving electrodes; and b) optionally a background layer, wherein exposed area in the sub-pixel or pixel is at least about 30% of the area of the area of the sub-pixel or pixel.

In one embodiment, the exposed area is at least about 50% of the area of the sub-pixel or pixel. In another embodiment, the exposed area is at least about 70% of the area of the sub-pixel or pixel.

In one embodiment, the driving electrodes comprise driving electrode of the first size and driving electrode of the second size. In one embodiment, the first size is the same as the second size. In one embodiment, the ratio of area of the driving electrode of the first size to the area of the driving electrode of the second size is 1.5:1 to 10:1. In one embodiment, the ratio of area of the driving electrode of the first size to the area of the driving electrode of the second size is 2:1 to 4:1.

In one embodiment, the display fluid comprises one type of charged pigment particles dispersed in a solvent or solvent mixture. In another embodiment, the display fluid comprises two types of charged pigment particles dispersed in a solvent or solvent mixture, wherein the two types of charged pigment particles carry opposite charge polarities and are of contrasting colors.

In one embodiment, the two types of charged pigment particles are black and white, respectively.

In one embodiment, the background layer is red, green or blue.

In one embodiment, the display fluid is contained within display cells.

In one embodiment, the display cells are microcups. In another embodiment, the display cells are microcapsules.

In one embodiment, the display cells are aligned with the sub-pixels or pixels. In another embodiment, the display cells are not aligned with the sub-pixels or pixels.

In one embodiment, the background layer is a sealing layer enclosing the display fluid within the display cells.

In one embodiment, the solvent or solvent mixture is colorless and clear or colored and clear.

In one embodiment, each pixel comprises three sub-pixels each of which has a background layer of red, green or blue, respectively.

In one embodiment, each pixel comprises three sub-pixels each of which has a solvent or solvent mixture of red, green or blue, respectively.

BRIEF DISCUSSION OF THE DRAWINGS

FIGS. 3, 3a, 3b, and 3c explain the term "exposed area".

Figure 4:
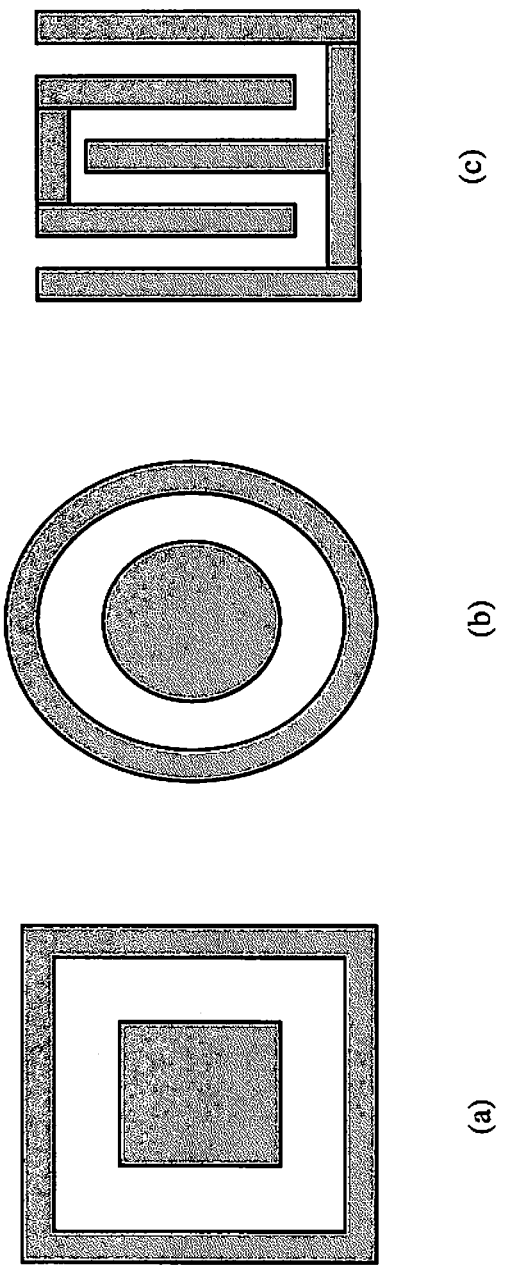

FIG. 4 depicts other shapes of driving electrodes which may be applied to the present invention.

FIGS. 5a and 5b illustrate how different color states may be displayed with a one particle type fluid system comprising a colorless and clear solvent.

FIGS. 6a-6e illustrate how different color states may be displayed with a two particle type fluid system comprising a colorless and clear solvent.

Figure 7:
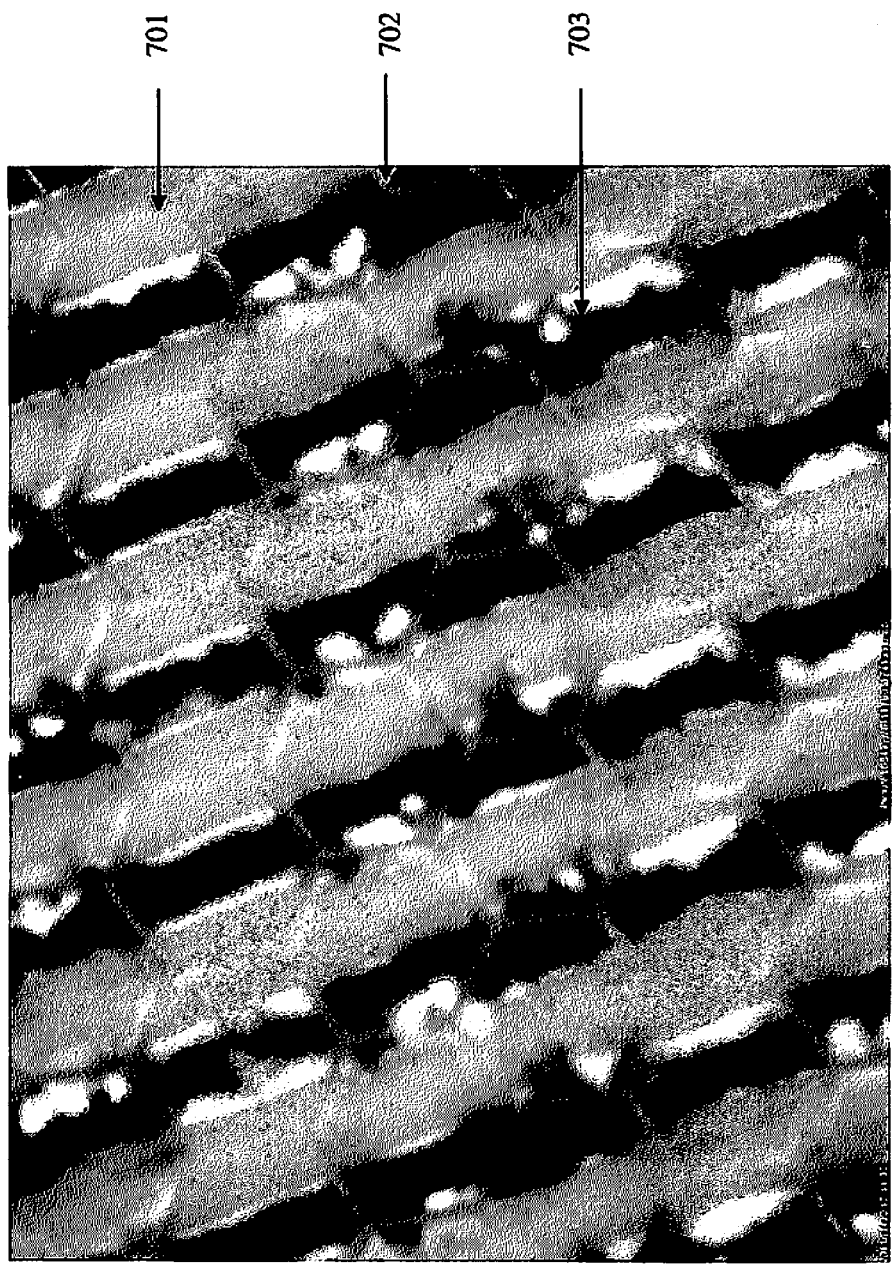

FIG. 7 is a photograph, taken under a microscope, of the viewing side of FIG. 6e.

FIGS. 8a-8e illustrate how different color states may be displayed with a two particle type fluid system comprising a colored and clear solvent.

Figure 9:
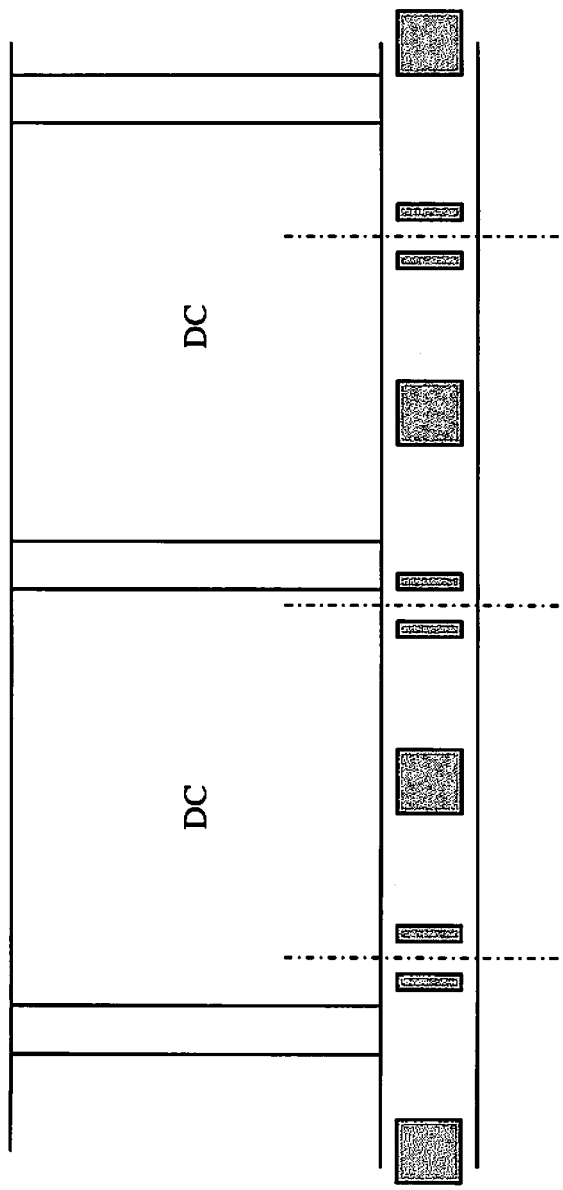

FIG. 9 shows how display cells and the sub-pixels or pixels do not have to be aligned.

Figure 10A:
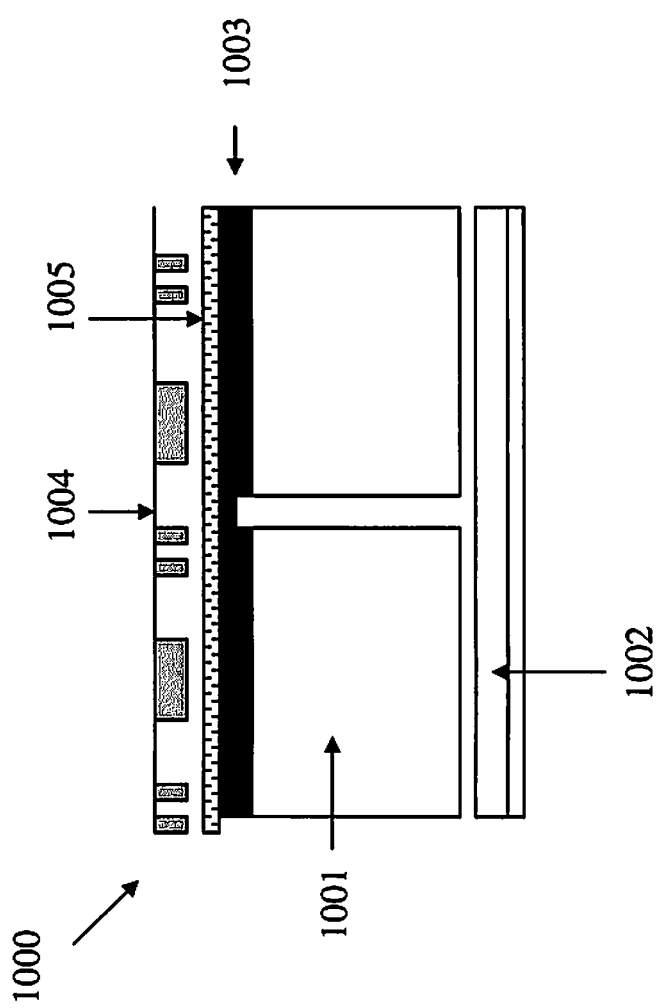
Figure 10B:
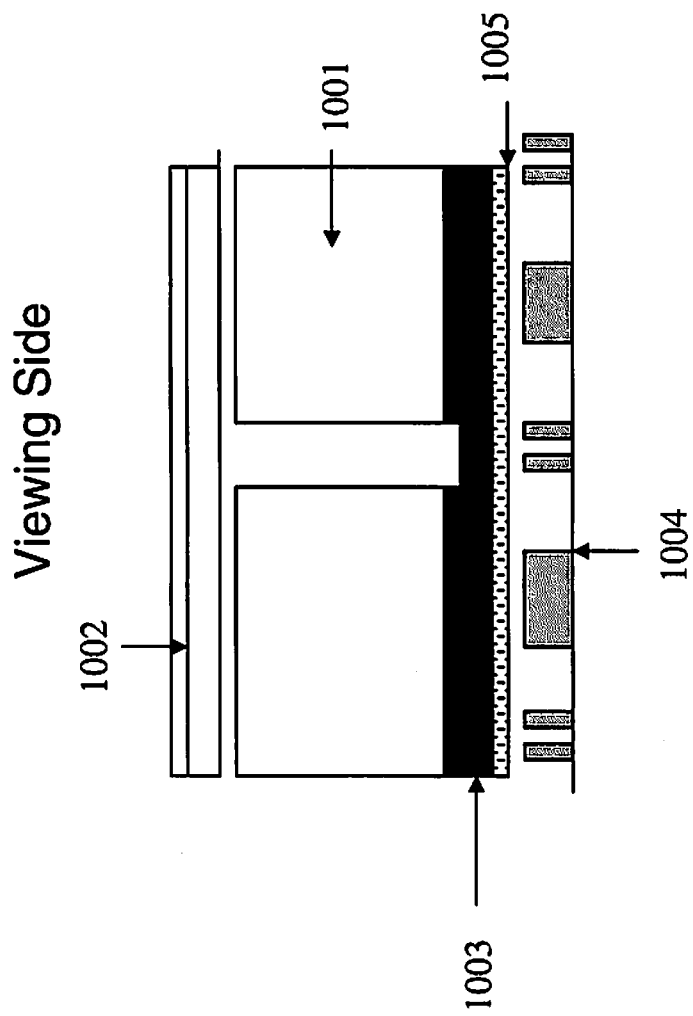

FIGS. 10a and 10b illustrate a display device with colored sealing layer serving as a background layer.

Figure 11:
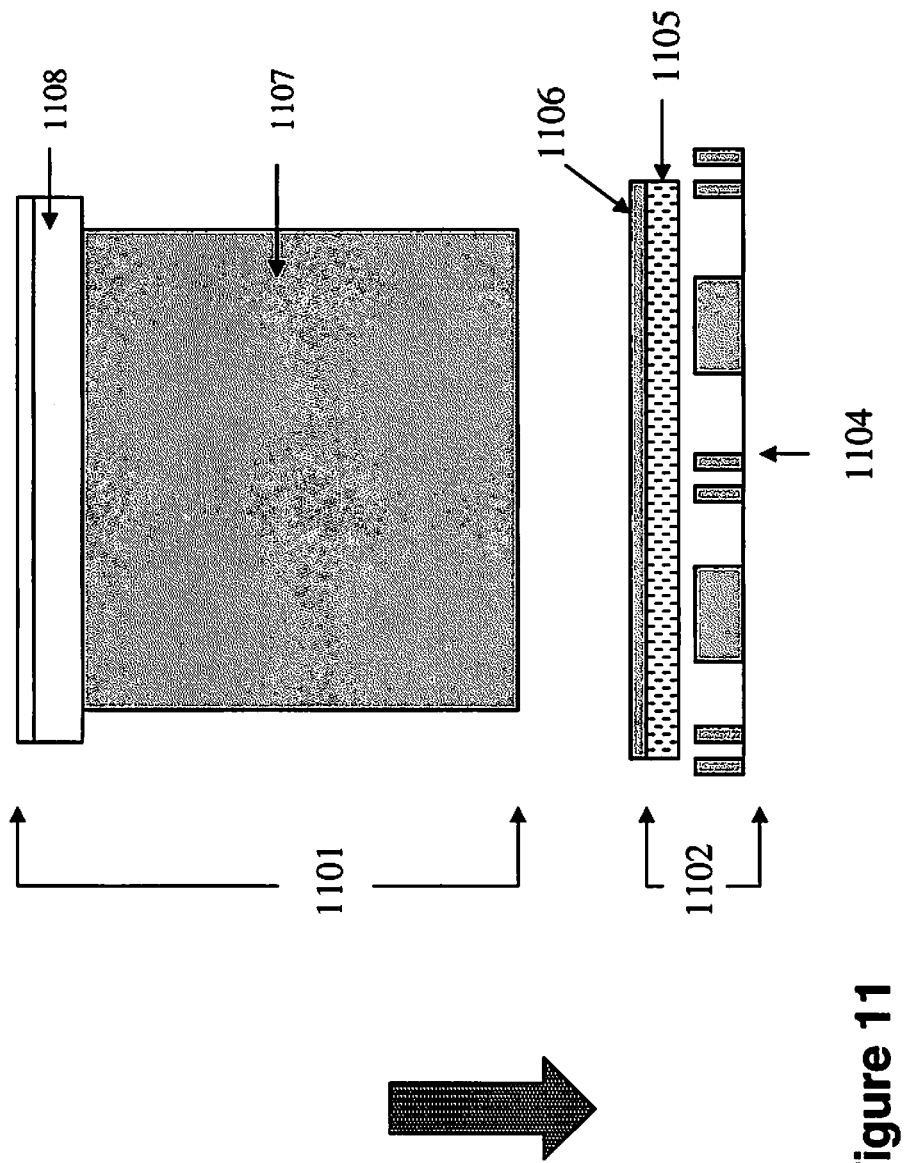

FIG. 11 illustrates an alternative method for forming a colored background layer.

Figure 12:
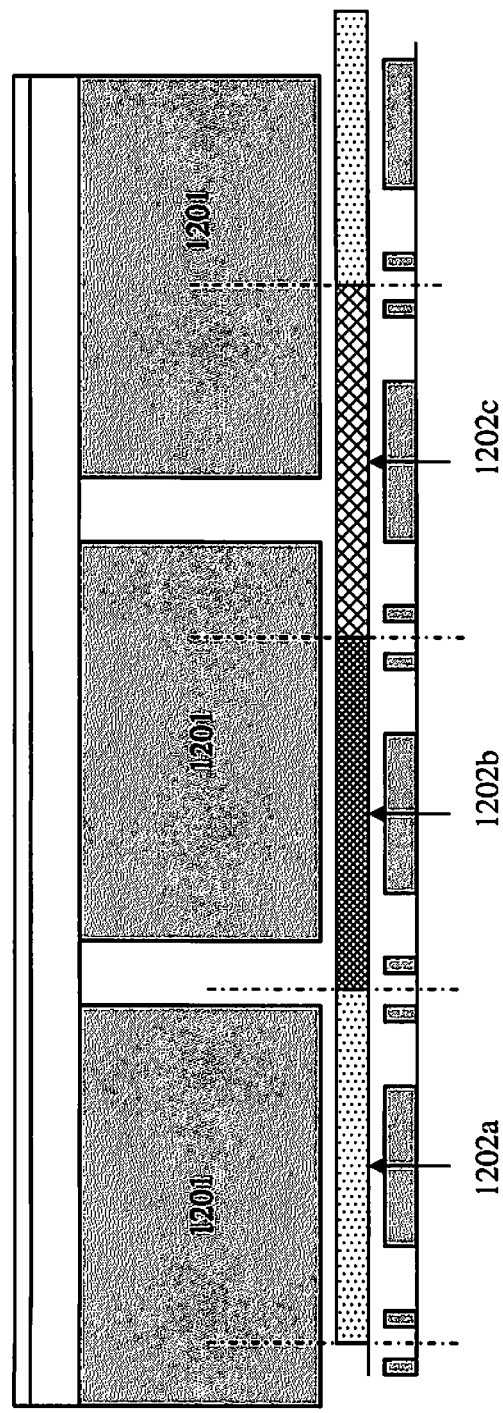

FIG. 12 is an example of the display device of the present invention.

DETAILED DESCRIPTION OF THE INVENTION

Figure 1:
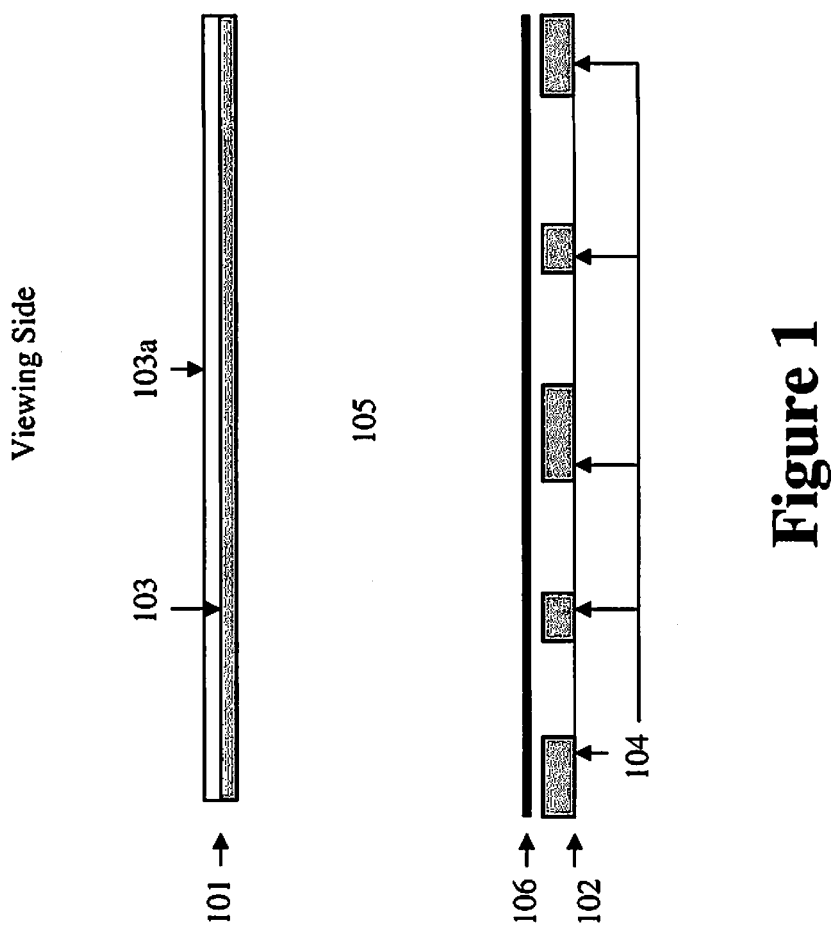
FIG. 1 depicts a cross-section view of a display device of the present invention wherein the second layer has multiple driving electrodes.

FIG. 1 depicts a cross-section view of a display device of the present invention. In this design, a display fluid (105) is sandwiched between a first layer (101) and a second layer (102). The first layer comprises a common electrode (103) and the second layer comprises a plurality of driving electrodes (104). The common electrode is usually on a plastic substrate or a piece of glass (103a).

The display device further comprises a background layer (106) which may be above the second layer (as shown), or underneath the second layer or the second layer may act as the background layer. The formation of the colored background layers is discussed in a section below.

The display fluid (105) may be an electrophoretic fluid comprising one, two or multiple types of particles. The solvent in the display fluid may be clear and colorless or clear and colored.

The common electrode (103) in FIG. 1 is usually a transparent electrode layer (e.g., ITO), spreading over the entire top of the display device. The driving electrodes (104) are described in U.S. Pat. No. 7,046,228, the content of which is incorporated herein by reference in its entirety.

It is noted that while active matrix driving with a thin film transistor (TFT) backplane is mentioned for the second layer (102), the scope of the present invention encompasses other types of electrode addressing as long as the electrodes serve the desired functions.

Figure 2:
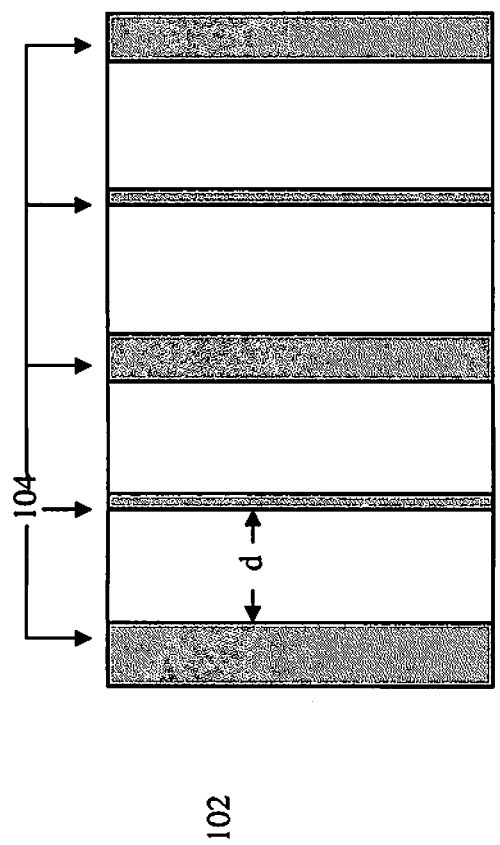
FIG. 2 is the top view of the second layer of the display device of FIG. 1.

FIG. 2 is the top view of the second layer (102) in FIG. 1. As shown, there is a distance (d) between the neighboring driving electrodes (104).

The term "exposed area", used in the present invention, refers to the area not covered by particles. FIG. 3 illustrate this term. Each of the areas between the electrodes is referred to as a gap area (marked G in the figure). For simplicity, it is assumed, in this example, that the sizes of all gap areas are the same. When the particles move to be collected on certain driving electrodes, the background layer is exposed. In this example, the background layer is on top of the driving electrodes.

For example, when particles cover all 4 electrodes (2 E1+2 E2) as shown in FIG. 3a, the exposed area would be the sum of all gap areas (i.e., 3×G). If the particles only cover both E1 electrodes as shown in FIG. 3b, then the exposed area would be 3×G+2×E2. If the particles only cover both E2electrodes, as shown in FIG. 3c, the exposed area then would be 3×G+2×E1.

In one embodiment, the total area of the "exposed area" may be at least about 30%, preferably at least about 50% and more preferably at least about 70%, of the area of a sub-pixel or pixel.

It is noted that the sizes of the gap areas can be different.

The widths of the driving electrodes do not have to be identical. In one embodiment as shown in FIG. 2, the wider driving electrodes and the narrower driving electrodes are alternating.

In practice, the two sets of driving electrodes may have the same size or different sizes. Therefore, the ratio of the area of one driving electrode to the area of the other driving electrode may be 1:1 to 10:1, preferably 1.5:1 to 10:1 and more preferably 2:1 to 4:1.

The structure shown in FIGS. 1 and 2 may comprise more than one sub-pixel or pixel. The sub-pixel or pixel does not have to be aligned with display cells, details of which are given below.

The sizes of the driving electrodes on the same second layer may be the same or different, depending on particle loading.

The shapes of the driving electrodes may also be varied to enhance the particle moving efficiency. For example, the driving electrodes may be rectangular in shape, as shown in FIG. 2. There are a wide variety of other electrode shapes (square, round or irregular) which may be applied to the present invention. Some of the examples are shown in FIG. 4.

It is noted that some of the driving electrodes on the second layer may be spatially separated; but are electrically connected. For example, the driving electrodes of the same width in FIG. 2 may be electrically connected, for ease of operation. However, the connection is not absolutely needed.

FIGS. 5a and 5b illustrate how a display device of the present invention, in which an electrophoretic fluid comprising white pigment particles dispersed in a clear and colorless solvent or solvent mixture operates.

For ease of illustration, in these figures and others, four driving electrodes are shown and they represent a sub-pixel or pixel.

Also for illustration purpose, it is assumed that the white pigment particles are negatively charged and the background layer (506) is colored (e.g., red), in FIGS. 5a and 5b. The colors of the pigment particles and the background layer may vary. They are not limited to white and red, respectively.

In FIG. 5a, when the common electrode (503) is applied a voltage potential which is higher than that applied to the four driving electrodes (504a, 504b, 504c and 504d), the negatively charged white pigment particles would move to be near or at the common electrode. As a result, a white color state is seen at the viewing side.

In FIG. 5b, as an example, the common electrode (503) is set at ground; the driving electrodes 504a and 504c are applied a voltage potential which is higher than that applied to the common electrode (503); and the driving electrodes 504b and 504d are applied a voltage potential which may be the same as that applied to the common electrode (503). In this case, the white pigment particles would move to be near or at the driving electrodes 504a and 504c and as a result, the background color (i.e., red) is seen at the viewing side.

FIGS. 6a-6e illustrate a further alternative design in which two types of pigment particles (i.e., black and white) are dispersed in a clear and colorless solvent or solvent mixture. In this case, there is a colored (e.g., red) background layer (606).

For illustration purpose, it is assumed that the white particles are negatively charged and the black particles are positively charged.

In FIG. 6a, when the common electrode (603) is applied a voltage potential which is higher than that applied to the four driving electrodes (604a, 604b, 604c and 604d), the negatively charged white particles would move to be near or at the common electrode while the positively charged black particles would move to be near or at the four driving electrodes. As a result, the white color is seen at the viewing side.

In FIG. 6b, when the common electrode (603) is applied a voltage potential which is lower than that applied to the four driving electrodes (604a, 604b, 604c and 604d), the negatively charged white particles would move to be near or at the four driving electrodes while the positively charged black particles would move to be near or at the common electrode. As a result, the black color is seen at the viewing side.

In FIG. 6c, the driving electrodes 604a and 604c are applied a voltage potential which is higher than that applied to the common electrode (603) and the driving electrodes 604b and 604d are applied a voltage potential which is lower than that applied to the common electrode. In this case, the negatively charged white pigment particles would move to be near or at the driving electrodes 604a and 604c and the positively charged black particles would move to be near or at the driving electrodes 604b and 604d. As a result, the color of the background layer (606) is seen at the viewing side.

In practice, a small percentage of the black and white particles may move to be near or at the common electrode as shown in FIG. 6d. However, in either the scenario of FIG. 6c or the scenario of FIG. 6d, the color of the background layer is seen at the viewing side.

FIG. 6e depicts another scenario in which the background color is seen. In this case, the driving electrodes 604b and 604d are applied a voltage higher than that applied to the common electrode 603 and the other two driving electrodes 604a and 604c and as a result, white particles are driven to be near or at the driving electrodes 604b and 604d and all of the black particles carrying charge opposite of that of the white particles may move to be near or at the common electrode in positions opposite of the driving electrodes 604b and 604d. It is also possible that only some of the black particles move to be near or at the common electrode as shown and the other black particles may scatter in the display fluid.

The color displayed according to FIGS. 6c and 6d would be brighter and less saturated because some of the white particles may be seen at the viewing side. The color displayed according to FIG. 6e would be more saturated because most of the white particles are blocked by the black particles at the viewing side.

FIG. 7 is a photograph taken under a microscope of FIG. 6e. The red area (701) is the dominant color seen. The hexagons (702) seen under the microscope are the microcups (i.e., display cells filled with the display fluid). Area 703 shows the collection area for the white and black particles.

FIGS. 8a-8e illustrate yet a further alternative design in which two types of pigment particles (i.e., black and white) are dispersed in a clear and colored solvent or solvent mixture. In this case, there is an optional background layer (806). The background layer may be of the white color or another type of reflective layer.

The black and white particles are driven to their respective positions in FIGS. 8a-8e, in the same manner as that shown in FIGS. 6a-6e. FIG. 8a displays a white color state and FIG. 8b displays a black color state. FIG. 8c-8e display the color of the solvent.

The term "display cell" refers to a micro-container filled with a display fluid. A display cell may be a microcup as described in U.S. Pat. No. 6,930,818, the content of which is incorporated herein by reference in its entirety.

A display cell may also be any other micro-containers (e.g., microcapsules or microchannels), regardless of their shapes or sizes. All of these are within the scope of the present application, as long as the micro-containers are filled with a display fluid and have the same functions as the microcups.

In an aligned type, each set of the driving electrodes is within the boundary of a display cell (DC). For the microcup-type of display cells, the boundary of a display cell is the partition walls surrounding the display cell. For the microcapsule-type of display cells, the boundary of a display cell is the polymeric matrix material in which the microcapsules are embedded.

FIG. 9 shows how the display cells and the driving electrodes do not have to be aligned. In this figure, each pixel (marked by dotted line) has three driving electrodes. The display cells are not aligned with the driving electrodes. However, the sub-pixels or pixels have to be aligned with the driving electrodes.

In any case, the size of each pixel or sub-pixel is smaller than that of a display cell (e.g., microcup).

The charged pigment particles used in the present invention, may be formed from an inorganic pigment, such as $TiO_2$, $ZrO_2$, $ZnO$, $Al_2O_3$, CI pigment black 26 or 28 or the like (e.g., manganese ferrite black spinel or copper chromite black spinel). They also may be formed from an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

The charged pigment particles may also be particles coated with a polymer layer on their surface and the polymer coating can be prepared through various conventionally known polymerization techniques.

The charged pigment particles may carry a natural charge or are charged through the presence of a charge controlling agent.

The solvent or solvent mixture in which the charged pigment particles are dispersed preferably has a low viscosity and a dielectric constant in the range of about 2 to about 30, preferably about 2 to about 15 for high particle mobility. Examples of suitable dielectric solvent are well-known in the art.

The electrophoretic fluid of the present invention may also comprise other additives such as a charge controlling agent. The charge control agent (CCA) used in all embodiments of the present invention is compatible with the solvent in the electrophoretic fluid and may interact with the surface of the charged particles to effectively generate either positive or negative charge for the particles. Useful ionic charge control agents include, but are not limited to, sodium dodecylbenzenesulfonate, metal soap, polybutene succinimide, maleic anhydride copolymers, vinylpyridine copolymers, vinylpyrrolidone copolymer, (meth)acrylic acid copolymers or N,N-dimethylaminoethyl (meth)acrylate copolymers), Alcolec LV30 (soy lecithin), Petrostep B100 (petroleum sulfonate) or B70 (barium sulfonate), Solsperse 17000 (active polymeric dispersant), Solsperse 9000 (active polymeric dispersant), OLOA 11000 (succinimide ashless dispersant), OLOA 1200 (polyisobutylene succinimides), Unithox 750 (ethoxylates), Petronate L (sodium sulfonate), Disper BYK 101, 2095, 185, 116, 9077 & 220 and ANTI-TERRA series.

A white or colored background layer may be achieved by adding a color filter or a colored adhesive layer over the layer comprising driving electrodes (i.e., the second layer in FIG. 1). Alternatively, the color pattern may be printed, thermal transferred or deposited over the driving electrodes.

In a further embodiment of the present invention, the background layer may be made white or colored by other methods.

A first option is particularly suitable for the electrophoretic display prepared from the microcup technology as described in U.S. Pat. No. 6,930,818.

As shown in FIG. 10a, a film structure (1000) comprising microcup-based display cells (1001) is formed on a light transmissive electrode layer (1002) and then filled and sealed according to U.S. Pat. No. 6,930,818. In this case, a colorant is added to the sealing composition to cause the sealing layer (1003) to become colored. The second layer (1004) comprising the driving electrodes is then laminated over the filled and sealed display cells, with an adhesive layer (1005).

The colorant added to the sealing composition may be a dye or pigment. The sealing layer may be a transparent colored layer or a reflective colored layer.

When used, the film structure is viewed from the side of the light transmissive electrode layer (1002), as shown in FIG. 10b. FIG. 10b is the same as FIG. 10a, except turned 180°. As a result, the sealing layer (1003) serves as a background layer.

There are several unique features of this option. For example, there is no need to add or form separate colored background layers and therefore it is particularly suitable for a highlight color display where the background layers are of the same color.

In addition, the adhesive layer (1005) may be made reflective (e.g., white) to serve both as an adhesive layer and a color brightness enhancement layer. In other words, a reflective adhesive layer underneath the sealing layer can further improve color brightness by reflecting more light back to the viewer.

A further advantage of this option is that because there is no need to place colored background layers or additional reflective layers directly on top of the driving electrodes, there would be less voltage loss due to the presence of the extra layers. As a result, the image transition speed could also be improved.

A further option is applicable to both a highlight color display and a full color display. This option is depicted in FIG. 11.

As shown, an adhesive layer (1105) is directly laminated on top of the layer (1104) comprising the driving electrodes. The adhesive layer could be a single layer covering the entire area.

The adhesive layer (1105) may be a reflective layer (i.e., white). A colored layer (1106) is then laminated, printed, thermal transferred or laser transferred onto the reflective adhesive layer (1105). For a multicolor display device, different colored background layers are aligned with the driving electrodes. The alignment is relatively easy since the adhesive layer can be laminated onto the layer comprising the driving electrodes first and then the colored layers could be placed on top of the adhesive layer by using addressing mark on the layer comprising the driving electrodes for alignment. The layer (1101) comprising the display fluid (1107) and the light transmissive electrode layer (1108) is then laminated to the adhesive layer structure (1102) to complete the display assembly.

Alternatively, in this case, the color could be absorbed by the white adhesive layer. For example, it may be accomplished by using precision printing technology to print a dye material on the white adhesive layer, and the white adhesive layer could absorb the color to display the color. One of the advantages of this option is that the white adhesive layer could enhance the reflectance efficiency of the color and cause the color to appear brighter.

FIG. 12 shows a representative of a display device of the present invention designed for a full color display. Each sub-pixel (marked by dotted lines) is aligned with a colored (red, green or blue) background layer (1202*a*, 1202*b* and 1202*c*), respectively. The display cells (1201) are not required to be aligned with the sub-pixels. In general, there are multiple sub-pixels in a pixel; therefore a full color display is possible.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A display device comprising one or more sub-pixels or pixels, which device comprises
   a) a display fluid comprising a first type of charged pigment particles and a second type of charged pigment particles dispersed in a solvent or solvent mixture and said display fluid is sandwiched between a first layer comprising a common electrode which is a transparent electrode layer spreading over the entire top of the display device and on a viewing side and a second layer comprising multiple driving electrodes; and
   b) a reflective background layer capable of reflecting light back to the viewing side, wherein exposed area in one of said sub-pixels or pixels is at least about 30% of the area of the sub-pixel or pixel and said sub-pixel or pixel displays color of the first type of charged pigment particles when the first type of charged pigment particles moves to be near or at the common electrode, displays color of the second type of charged pigment particles when the second type of charged pigment particles moves to be near or at the common electrode, and displays color of the reflective background layer or color of the solvent or solvent mixture when the first type of charged pigment particles moves to be near or at first selected driving electrodes and at the same time the second type of charged pigment particles moves to be near or at the common electrode at positions opposite the first selected driving electrodes.

2. The device of claim 1, wherein the exposed area is at least about 50%.

3. The device of claim 2, wherein the exposed area is at least about 70%.

4. The device of claim 1, wherein said driving electrodes comprise driving electrode of a first size and driving electrode of a second size.

5. The device of claim 4, wherein the first size is the same as the second size.

6. The device of claim 4, wherein the ratio of area of the driving electrode of the first size to the area of the driving electrode of the second size is 1.5:1 to 10:1.

7. The device of claim 6, wherein the ratio of area of the driving electrode of the first size to the area of the driving electrode of the second size is 2:1 to 4:1.

8. The device of claim 1, wherein the first type of charged pigment particles and the second type of charged pigment particles carry opposite charge polarities and are of contrasting colors.

9. The device of claim 8, wherein the two types of charged pigment particles are black and white, respectively.

10. The device of claim 8, wherein the solvent or solvent mixture is colorless and clear or colored and clear.

11. The device of claim 1, wherein the reflective background layer is red, green or blue.

12. The device of claim 1, wherein said display fluid is contained within display cells.

13. The device of claim 12, wherein the display cells are microcups.

14. The device of claim 13, wherein the display cells are microcapsules.

15. The device of claim 12, wherein the display cells are aligned with the sub-pixels or pixels.

16. The device of claim 12, wherein the display cells are not aligned with the sub-pixels or pixels.

17. The device of claim 12, wherein the reflective background layer is a sealing layer enclosing the display fluid within the display cells.

18. The device of claim 1, wherein each pixel comprises three sub-pixels each of which has the reflective background layer of red, green or blue.

19. The device of claim 1, wherein each pixel comprises three sub-pixels each of which has a solvent or solvent mixture of red, green or blue, respectively.

20. The device of claim 1, wherein the sub-pixel or pixel displays the color of the background layer or the color of the solvent or solvent mixture when some of the second type of charged pigment particles moves to be near or at second selected driving electrodes which are not covered by the first type of charged pigment particles and at the same time some of the first type of charged pigment particles moves to be near or at the common electrode at positions opposite the second selected driving electrodes.

21. The device of claim 1, wherein the first type of charged pigment particles is white and the second type of charged pigment particles is black.

* * * * *